United States Patent [19]
Wakabayashi

[11] Patent Number: 5,579,067
[45] Date of Patent: Nov. 26, 1996

[54] CAMERA CAPABLE OF RECORDING INFORMATION

[75] Inventor: Tsutomu Wakabayashi, Yokohama, Japan

[73] Assignee: Nikon Corporation, Tokyo, Japan

[21] Appl. No.: 358,459

[22] Filed: Dec. 19, 1994

[30] Foreign Application Priority Data

Dec. 17, 1993 [JP] Japan ................................. 5-318563

[51] Int. Cl.$^6$ ................................................ G03B 17/24
[52] U.S. Cl. ........................................ 396/311; 396/319
[58] Field of Search .................................. 354/105, 106

[56] References Cited

U.S. PATENT DOCUMENTS 4,470,677  9/1984  Tsujimoto et al. ....................... 354/106
5,006,873  4/1991  Wash ....................................... 354/106

Primary Examiner—David M. Gray
Attorney, Agent, or Firm—Oliff & Berridge

[57] ABSTRACT

A camera records information relating to each photographic frame of a film onto an information recording area provided on the film while the film is being fed. Regulating circuitry is provided to regulate the recordation so that no information is recorded for a frame under consideration when it is confirmed that the information relating to the frame under consideration is the same as information relating to a previous frame. In all other cases information relating to a frame under consideration is recorded for the frame under consideration. This greatly decreases the amount of information recorded when the same information continues for multiple frames and prevents wasteful expenditure of a battery power source.

21 Claims, 14 Drawing Sheets

CAMERA CAPABLE OF RECORDING INFORMATION

BACKGROUND OF THE INVENTION

1. Field of the Invention

The present invention relates to a camera capable recording information relating to each photographic frame of a film onto the information recording area of the film.

2. Description of Related Art

Cameras are known in which film may be used which has a magnetic recording area extending along film in the lengthwise direction. Information relating to each photographic frame is recorded by a magnetic head onto this magnetic recording area as disclosed in, for example, U.S. Pat. No. 5,006,873 to Wash. Such a camera powers the above-mentioned magnetic head and a feed of the film frame after each frame has been photographed, and records the information relating to the frame onto the magnetic recording area. The recorded information may, for example, be a date of photography, an exposure value, a print size, or characters input in advance by the photographer (such as characters showing the location of the photography or the like). The recorded information is then regenerated by a printing device in a lab, print conditions being determined based on the regenerated information, the date of photography, characters and the like being conveniently recorded on a blank portion or the rear surface of the print.

There are many cases involving an information recording camera such as that described above in which the same information is recorded for several consecutive frames. For example, if ten frames are photographed in one day, the date of photographic information for each of the frames will be the same. In this case, if the date of photographic information is recorded for only a certain one of the frames among the ten frames and it is understood that the other nine frames are the same, the amount of information to be recorded will be less than when the date of photographic information is recorded for each of the ten frames. Other conceivable examples of the same information being recorded for multiple consecutive frames, in addition to the date of photographic information described above, might be the location of photography and type of object being photographed (both of which are input in advance by a user). Concerning film sensitivity information, all photographic frames will be the same, and when consecutive photographs are taken, it may be assumed that the information relating to each photographic frame will be virtually unchanged.

Therefore, in such a case, the information may be recorded for any one of the frames and the other frames set to be the same. However, on a conventional camera, since this type of consideration is not taken into account, the information is recorded for every frame even if it is the same information. The battery power source is, therefore, wastefully expended in recording unnecessary information.

SUMMARY OF THE INVENTION

It is an object of the present invention to provide a camera capable of recording information which greatly decreases the amount of information to be recorded when multiple frames are photographed in succession to prevent the wasteful expenditure of a battery power source.

The present invention applies to a camera equipped with a recording means that accompanies the film feed and makes it possible to record the information relating to each frame onto an information recording area provided on the film. When it is confirmed that the information relating to a photographic frame under consideration is the same as the information relating to a previous photographic frame, the recording means is regulated by a regulating means in such a manner that the information is not recorded for the photographic frame under consideration. In all other cases, the recording means is regulated by the regulating means in such a manner that information relating to the photographic frame under consideration is recorded, thereby resolving the described problem.

In particular, according to an embodiment of the invention, the regulating means regulates the recording means, which records information indicating whether the film has been photographed by means of a normal wind method or with a pre-wind method onto the information recording area, independent of the information relating to the photographic frame.

When it is confirmed that information relating to a photographic frame under consideration is the same as information relating to a previous photographic frame, the information is not recorded for the photographic frame under consideration. Thus, when the same information continues for multiple frames, the information is recorded for only the first frame photographed and is not recorded for the other frames. Therefore, the amount of information recorded to the information recording area of the film is greatly reduced when compared to a case of recording the same information for every frame.

Furthermore, concerning photographic frames in which no information is recorded, prints may also be constructed for each frame for which no information is recorded without difficulty by constructing a printing device that prepares a print under the same conditions as the previous photographic frame and records it onto the print.

DETAILED DESCRIPTION OF PREFERRED EMBODIMENTS

An embodiment of the present invention is described hereafter, with reference to FIGS. 1 to 7.

Figure 2:
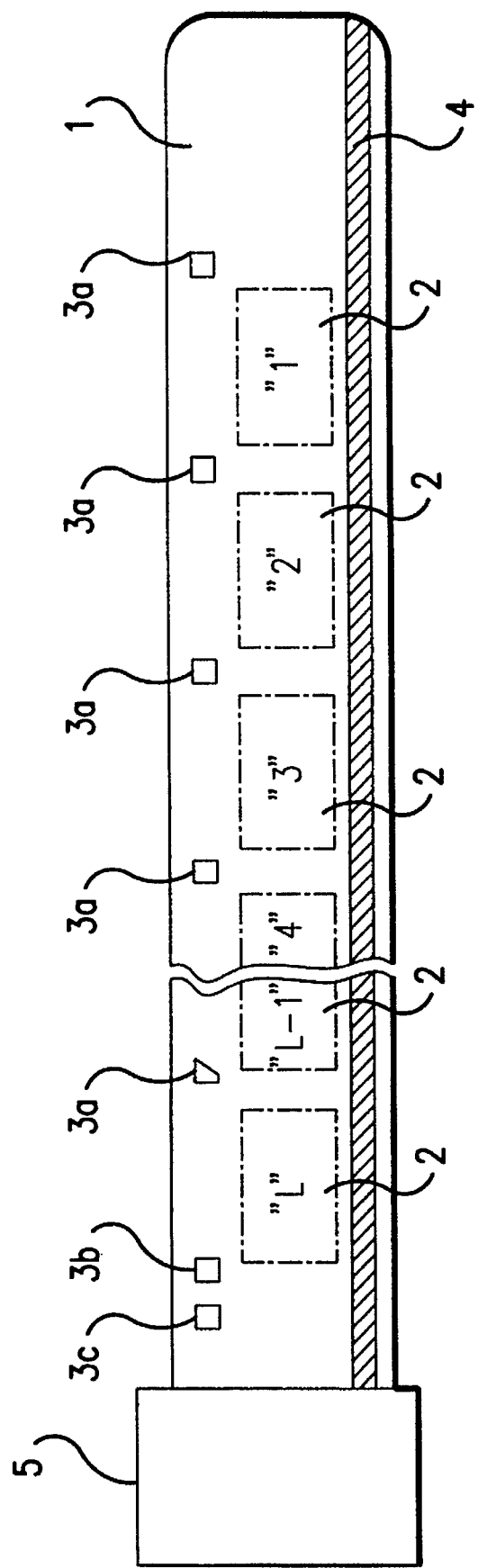
FIG. 2 is a drawing showing the construction of the film.

FIG. 2 is a drawing showing the film used in the present embodiment. As shown in the drawing, the frame numbers of each photographic frame 2 are as follows, from the leading end of the film 1 to the trailing end: 1, 2, 3, ..., L-1, L. At the top part of this film 1, a perforation 3a is provided at the leading end of each photographic frame 2, and a perforation 3b is provided at the trailing end of the Lth frame (the last frame). The space between this perforation 3b and the perforation 3a of the last frame is the same as the space between the perforations 3a of each frame.

A perforation 3c is provided beyond the perforation 3b toward the trailing end, the space between the perforation 3c and the perforation 3b being on the order of ⅓–¼ of the space between the perforations 3a of each frame.

At the bottom portion of the film 1, as in U.S. Pat. No. 5,006,873 to Wash, a magnetic recording area 4 extends in the lengthwise direction. Information relating to each photographic frame can be recorded onto the magnetic recording area 4, accompanying the feed (winding up) of the film after each frame has been photographed, by a recording circuit 52 via a magnetic head 17, which is described hereafter. Examples of possible information to be recorded that may be used to set print conditions in the lab, in addition to a date of photography, are: exposure value (shutter second time, stop value), alphanumeric numeric or character/numeric information, the place of photography, the name of the object being photographed, or the like. This information may be input by the user using an inputting means (not shown), and may include trimming magnification, exposure correcting values, degree of brightness of the object being photographed, whether or not a flash was used, print size, number of prints, a signal that suppresses the exposure correcting action in the laboratory, and so forth. A film cartridge 5 accommodates the film 1.

Exposure correcting actions that can be performed in the laboratory are, for example, when a photographer performs auto-bracketing photography (photography in which the exposure value is changed little by little (incrementally)), if the lab is regulated so as to automatically print at the proper exposure, the photographs will all be exposed at the same exposure value and the auto-bracketing aspect of the photography will be meaningless. In summary, the signal that suppresses the exposure correcting action in the laboratory is information that prevents the type of situation described above.

Figure 3:
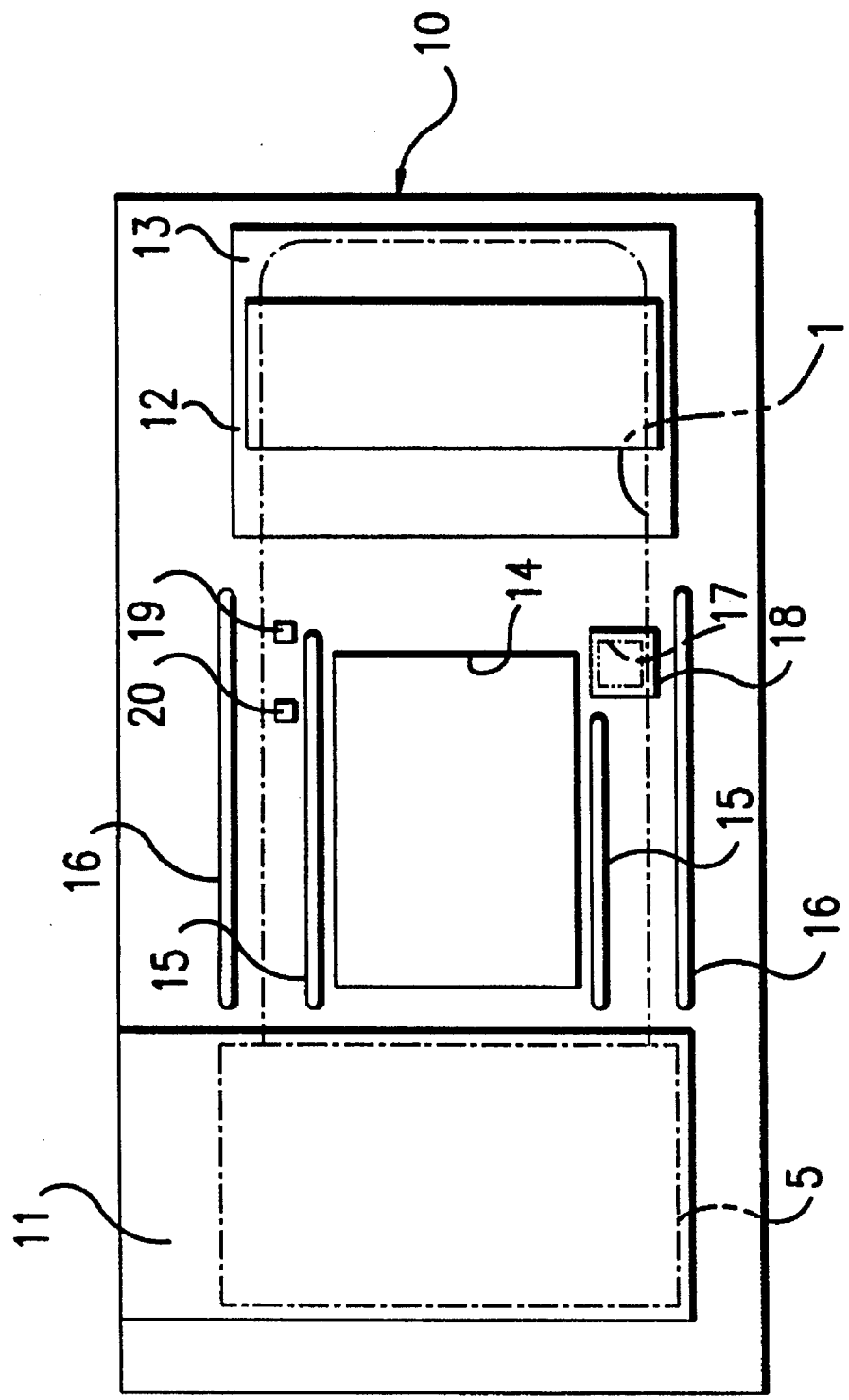
FIG. 3 is a drawing showing the construction of a normal wind camera.

FIG. 3 is a drawing showing a normal wind camera (a camera that employs the normal wind method) used in the present embodiment, as seen from the rear, with the back surface removed. The normal wind method is a method which photographs in order from the frame at the leading end of the film 1 to the frame at the trailing end.

On one end of the camera 10 a cartridge chamber 11 is provided into which the above-mentioned cartridge 5 is loaded, and at the other end a spool chamber 13 accommodating a rotatable film winding spool 12 is provided. Between the two chambers is an aperture 14, which forms an opening for light exposure. The winding spool 12 is rotated by winding means or winding device 53 (FIG. 1) which rotates to feed the film. A driving component (not shown) that engages the spool of the above-mentioned cartridge 5 and drives the spool is positioned in the cartridge chamber 11 and rewinds the film 1 into the cartridge 5 by rotating the spool of the cartridge 5 through a rewinding device 58 (described hereafter). Above and below the aperture 14 are located an interior rail 15 and an exterior rail 16, which form the passage for the film.

Perforation detection elements 19 and 20 comprising photo reflectors or photo interrupters are positioned on the top portion of the aperture 14. A first perforation detection element 19 is positioned so as to be able to detect the perforation 3a of photographic frame 2 (arbitrarily selected) when the frame 2 is aligned with the aperture 14. A second perforation detection element 20 is positioned further toward the cartridge chamber 11 side, and is positioned so as to be capable of detecting the perforation 3c when the first perforation detection element 19 detects the above-mentioned perforation 3b. With the present embodiment, when the second perforation detection element 20 detects the perforation 3c, the film is determined to be at its end.

A magnetic head 17 for recording information relating to the photographic frame onto the magnetic recording area 4 of the film 1 and a pressing pad 18 that aligns with the magnetic head 17 are positioned at the bottom right side of the aperture 14, the film being pressed and held between the magnetic head 17 and pressing pad 18.

When photography is performed on the frame aligned with the aperture 14, the film is fed one frame, through which action the film 1 runs from the film cartridge 5 side to the winding spool 12 side. When the frame is fed, the above-mentioned magnetic head 17 records the information relating to the frame 2 onto the magnetic recording area 4 directly below the photographed frame (i.e. the frame aligned with the aperture).

Figure 4:
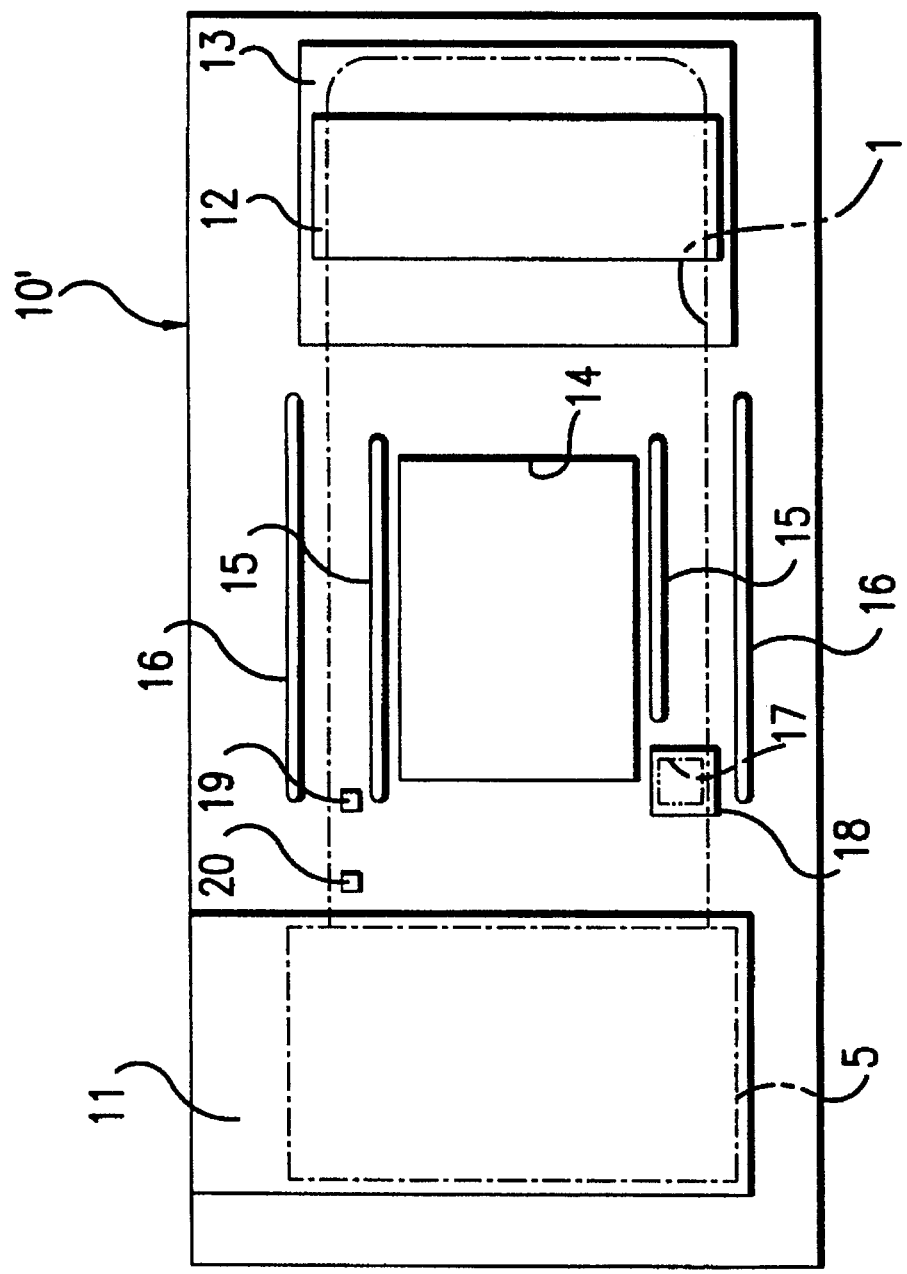
FIG. 4 is a drawing showing the construction of a pre-wind camera.

FIG. 4 is a drawing showing a pre-wind camera (a camera 10 which employs a pre-wind method) used in the present invention, as seen from the rear, with the back surface removed. The pre-wind method is a method in which loaded film 1 is initially wound up to the end and then photographed in order from a frame at the end of the film to a frame at the beginning of the film. Other than the change in the positions of the magnetic head 17, the pressing pad 18, and the perforation detection elements 19 and 20, the camera 10' in FIG. 4 is the same as the normal wind camera 10 in FIG. 3.

With the pre-wind camera 10', the direction that the frames are fed is different from that of the normal wind camera 10, which means that the film 1 is rewound one frame into the cartridge 5 after each frame is photographed. Since information is recorded at the bottom of the photographic frame when rewinding takes place, the magnetic head 17 is positioned at the lower left (the cartridge 5 side) of the aperture 14. The perforation detection element 20 is positioned at the upper left of the aperture 14 (the cartridge 5 side), namely at a position at which the above-mentioned perforation 3c can be detected when the last frame is aligned with the aperture 14. The perforation detection element 19 is positioned at the upper left of the aperture 14 so that the final position of the frame numbered "1" (the frame at the leading end) may be clearly discerned after photography and when magnetic recording is carried out below the frame.

Figure 1:
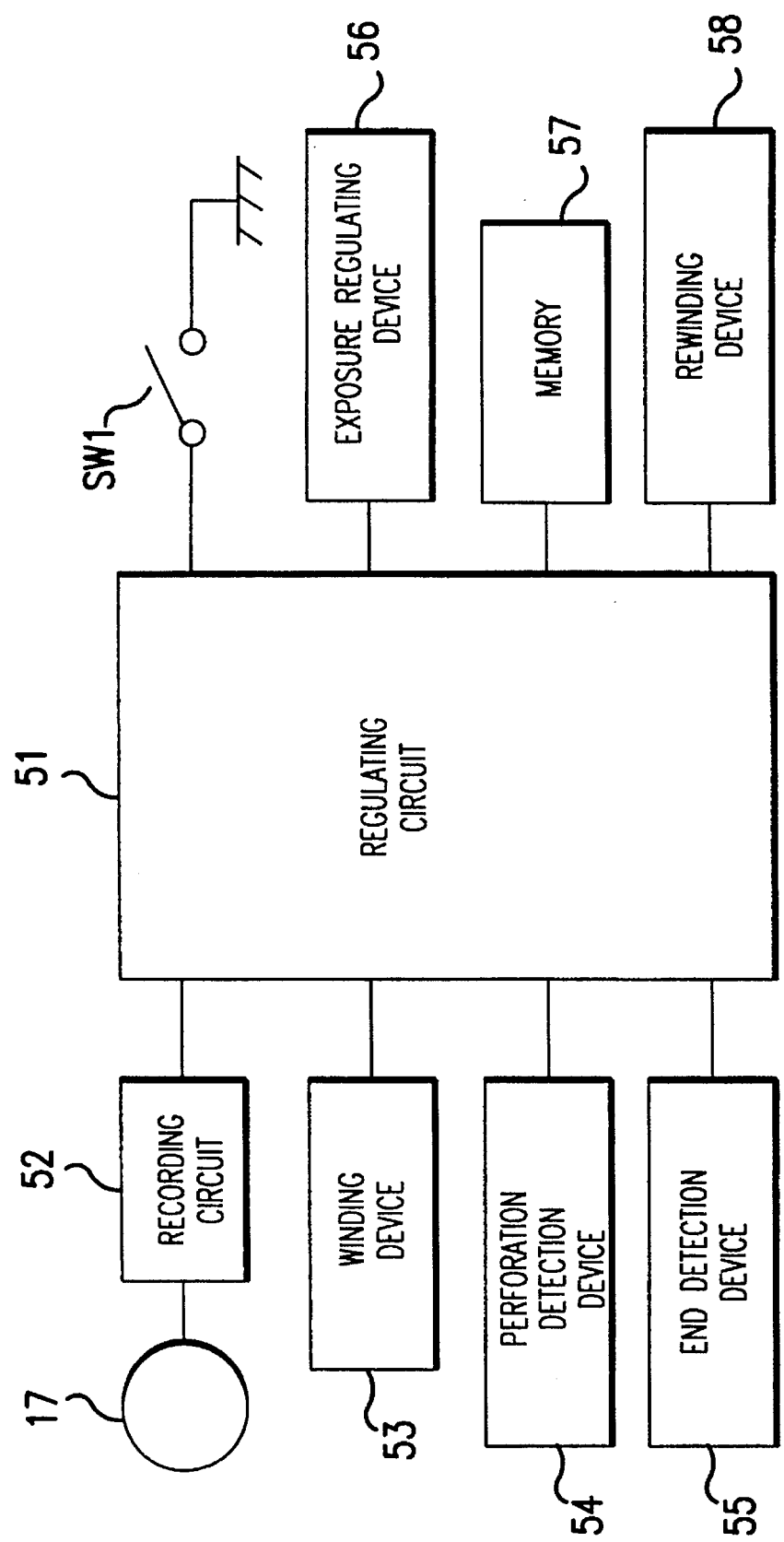
FIG. 1 is a block diagram showing the regulating system of a camera capable of recording information which relates to the present invention.

FIG. 1 is a block diagram showing the regulating system of the cameras described above (the system being common to both the normal wind camera 10 and the pre-wind camera 10'). A regulating circuit 51 regulates the camera based on the flow chart described hereafter. Each device and switch is connected to the regulating circuit 51 as indicated below.

A recording circuit 52 records information, via a magnetic head 17, onto the magnetic recording area provided on the film. A winding device 53 winds up the film, and is comprised of a film winding spool, a film feeding motor, a driving circuit for the film feeding motor, a speed reducing gear system, etc. (not shown in FIG. 1). The perforation detection means or device 54 comprises the above-mentioned perforation detection element 19, and a driving circuit for the perforation detection element 19, and the like. An end detection device 55, comprises the above-mentioned perforation detection element 20 and a driving circuit for the perforation detection element 20, and the like. An exposure regulating device 56 comprises a shutter, stop, and the like. Memory 57 stores (remembers) information that is to be recorded on the magnetic recording area of the film. A rewinding device 58 rewinds the film into the cartridge. Switch SW1 is a release switch that is turned on by depressing the release button (not shown) and turned off by releasing pressure from the release button.

Figure 5:
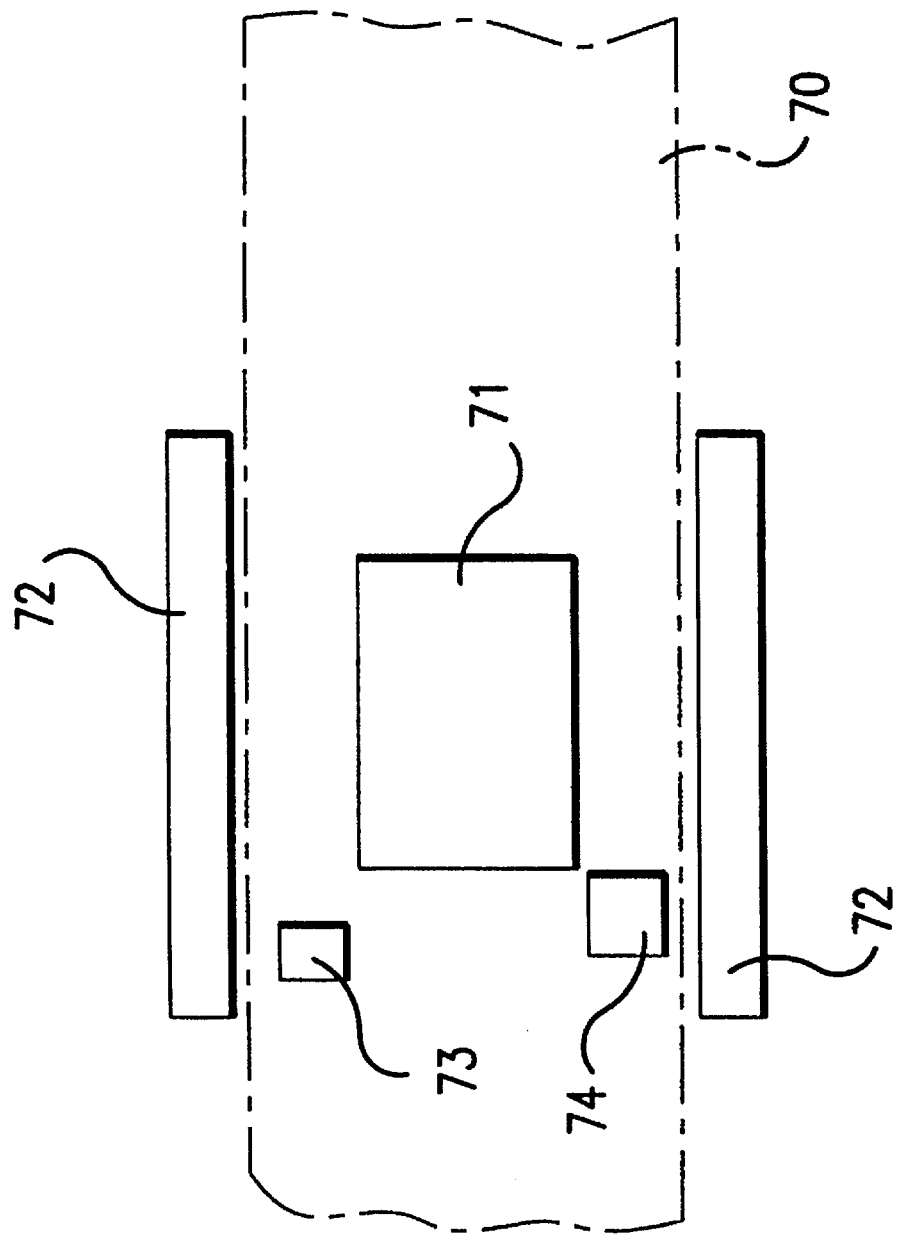
FIG. 5 is a drawing showing the essential components of a printing device.

FIG. 5 is a drawing showing components of a printing device in the lab, the printing device making prints from the film that has been photographed by the camera described above and developed.

An aperture 71 defines the print boundaries. A guide component 72 directs the feeding of developed film 70. A perforation detection element 73 detects the perforations of the developed film 70. A magnetic head 74 regenerates information from the magnetic recording region of the developed film 70 and which also records information to the magnetic recording region; multiple rolls of the developed film 70 being connected together, rolled up, and loaded into the printer device.

Figure 6:
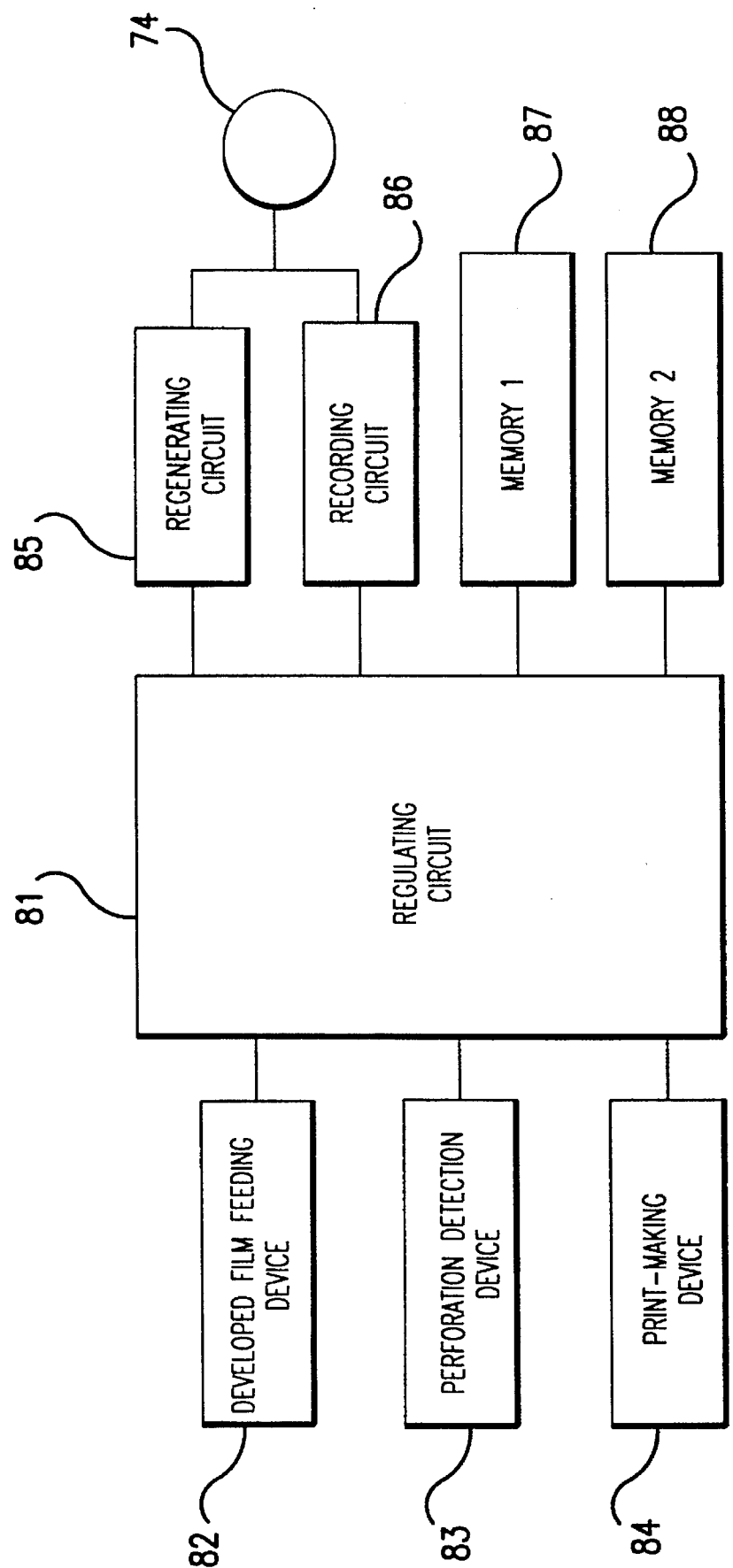
FIG. 6 is a drawing showing the regulating system of a printing device.

FIG. 6 shows the regulating means or system of the printing device described above, in which a regulating circuit 81 regulates, according to a flow chart described hereafter, each device being connected to the regulating circuit 81 as indicated below.

Developed film feeding means or device 82 advances the developed film 70. In FIG. 5, the developed film 70 is fed to the right to wind up, and fed to the left to rewind. Perforation detection means or device 83 comprises the perforation detection element 73 of FIG. 5, and a driving circuit of the perforation detection element 73, and the like. Commonly used print-making means or device 84 is used for making prints from the developed film. The print-making device 84 prints information onto finished prints as required, as well as making prints by printing photographs onto photographic paper. Based on the above-mentioned regenerated information, trimming, preparation of multiple prints, and changes in print size are carried out. Regenerating means or circuit 85 regenerates information from the magnetic recording area of the developed film 70 via a magnetic head 74. A recording circuit 86 records information onto the above-mentioned magnetic recording area via a magnetic head 74. First and second memory circuits 87,88 store information.

Figure 7:
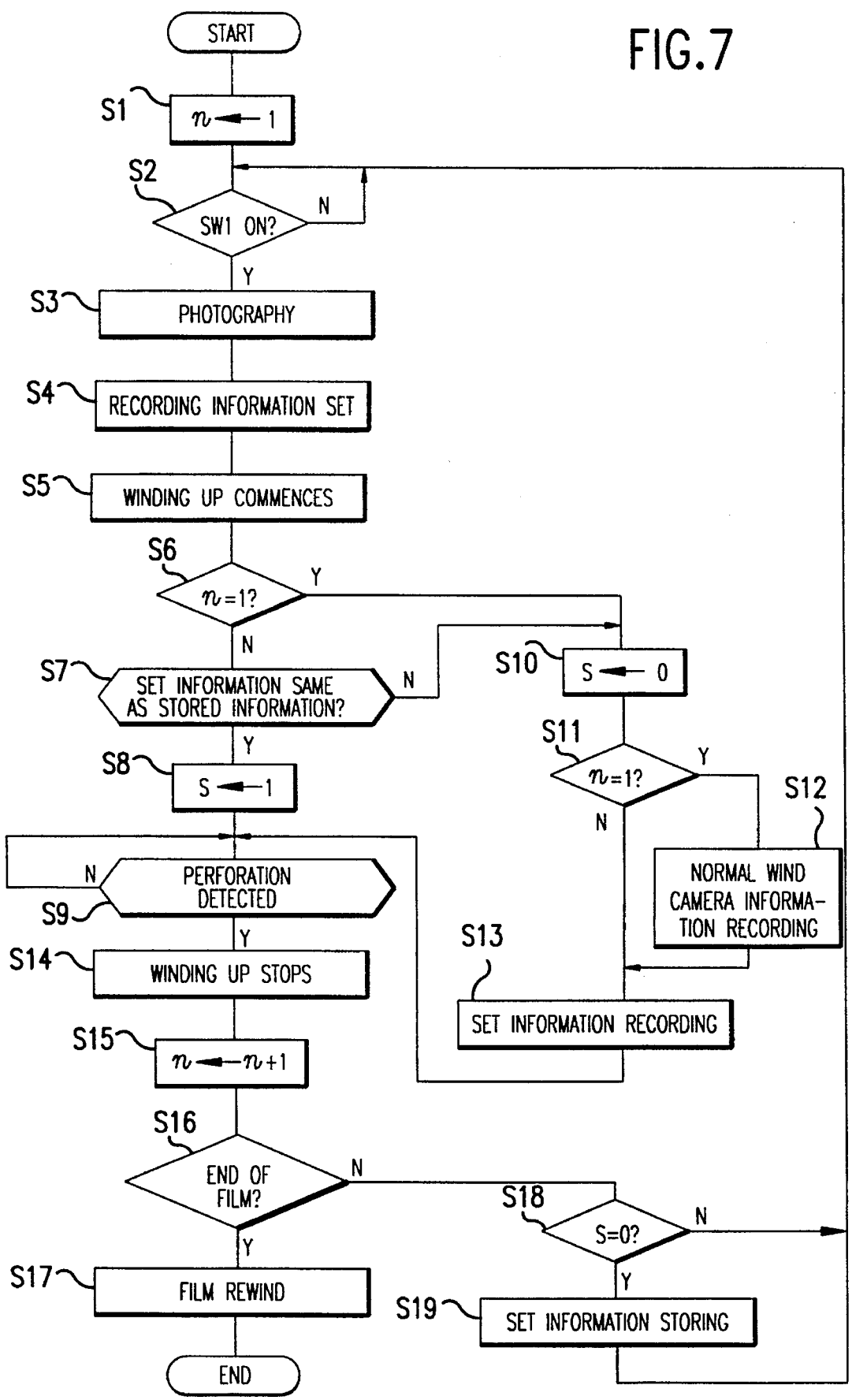
FIG. 7 is a flow chart describing the operation of a normal wind camera.

A photographic regulation procedure according to one embodiment of the invention followed by the regulating circuit 51 of the normal wind camera 10 is described hereafter, with reference to the flow chart of FIG. 7.

The program is activated when the first frame of the film 1 which has been loaded into the camera 10 is aligned with the aperture 14. First, in step S1, the parameter n indicating the photographic frame number is set at 1. In step S2, the program waits until the release switch SW1 is turned on, upon which photography is performed in step S3 via the exposure regulating device 56. In step S4, the information is set that is to be recorded onto the magnetic recording area 4 relating to the photographic frame.

In step S5, winding up of the film by the winding device 53 commences. In step S6, when it is determined that n=1, or in other words, that the current frame is the first frame, the program proceeds to step S10, a flag "s" is set at zero, and the program proceeds to step S11. In this instance, the flag "s" is to determine if the information set in the above-mentioned step S4 (referred to hereafter as "the set information") has been recorded, or if the set information has not been recorded because it is the same information as in the previous frame.

In step S11, a determination is made as to whether or not n=1. If n=1, the program proceeds to step S12; if not, the program proceeds to step S13. In step S12, the magnetic head 17 is driven by the recording circuit 52 and normal wind camera information is recorded onto the magnetic recording area 4, after which the program proceeds to step S13. The normal wind camera information is comprised of information that indicates that the film has been photographed by the normal wind method. In step S13, the above-mentioned set information is recorded to the magnetic recording area 4 by the recording circuit 52 via the magnetic head 17, after which the program moves to step S9.

If n≠1, or in other words, if it is determined that the current frame is not the first frame, the program proceeds to step S7, where a determination is made as to whether or not the above-mentioned set is exactly the same as the information recorded by storing the information in the memory 57 (referred to hereafter as the stored information) in step S19, which is described hereafter. If the information is not the same, the program moves to step S10; if the information is the same, the program moves to step S8, "s" is set at 1, and the program proceeds to step S9. In step S9, a determination is made, based on the output of the perforation detection device 54, whether or not the film has been wound up the length of one frame, or in other words, whether or not the perforation detection element 19 has detected the perforation 3a. If the element has detected the perforation, the film winding is stopped in step S14 and the program proceeds to step S15. The time required to record the set information and the above-mentioned normal wind camera information is somewhat shorter than the time required to wind up the film the length of one frame.

In step S15, the photographic frame number n is increased by 1, and in step S16 a determination is made, based on the output of the trailing end detection device 55, whether or not the film has reached its end, or in other words, whether or not the perforation 3c has been detected by the perforation detection element 20. If the film is at its end the program proceeds to step S17, the film 1 is completely rewound into the cartridge 5, and the procedure ends. If the film has not yet reached the end the program proceeds to step S18. If s≠0, the program returns directly to step S2; if s=0, the program returns to step S2 after storing the information set in step S4 to the memory 57 in step S19. Here, s=0 indicates that the set information has been recorded for the frame photographed in step S3.

By means of the above procedure, when photography of the first frame (frame number 1) of the film 1 has been completed, the set information and the normal wind camera information is recorded for this first frame. When a second frame is photographed thereafter, a determination is made as to whether or not the set information established for the photographic frame is the same as the information stored in the memory 57 (corresponding to the information relating to the previous photographic frame). If the information is not the same the set information is recorded; if the information is the same, no information is recorded for the current photographic frame under consideration.

Thus, when the same information continues for multiple frames, the information is only recorded for the first of the frames to be photographed and no information is recorded for the other frames. Therefore, according to the present embodiment, the amount of information to be recorded is greatly reduced when compared to the case of recording the same information for each of several consecutive frames.

Figure 8:
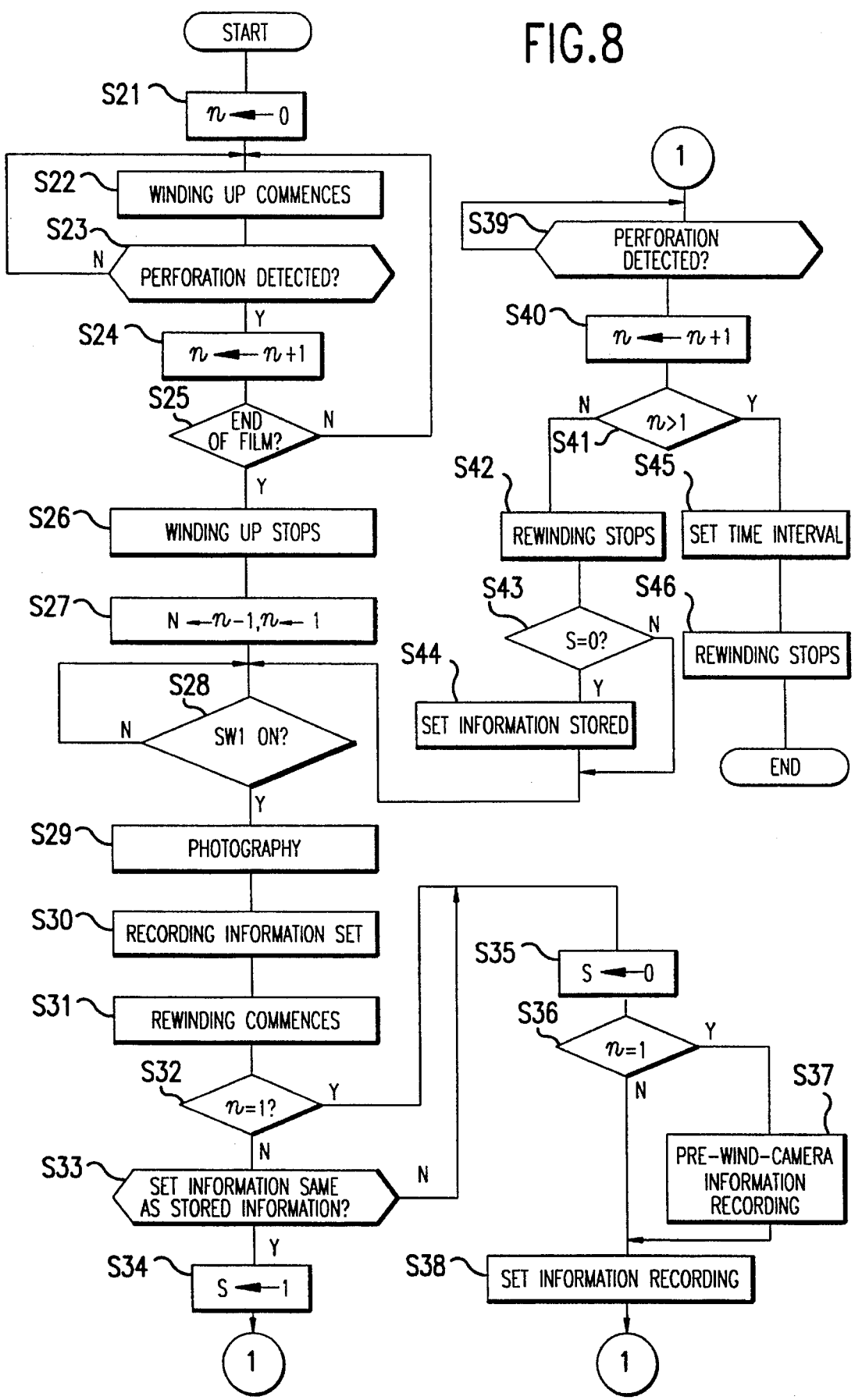
FIG. 8 is a flow chart describing the operation of a pre-wind camera.
Figure 9:
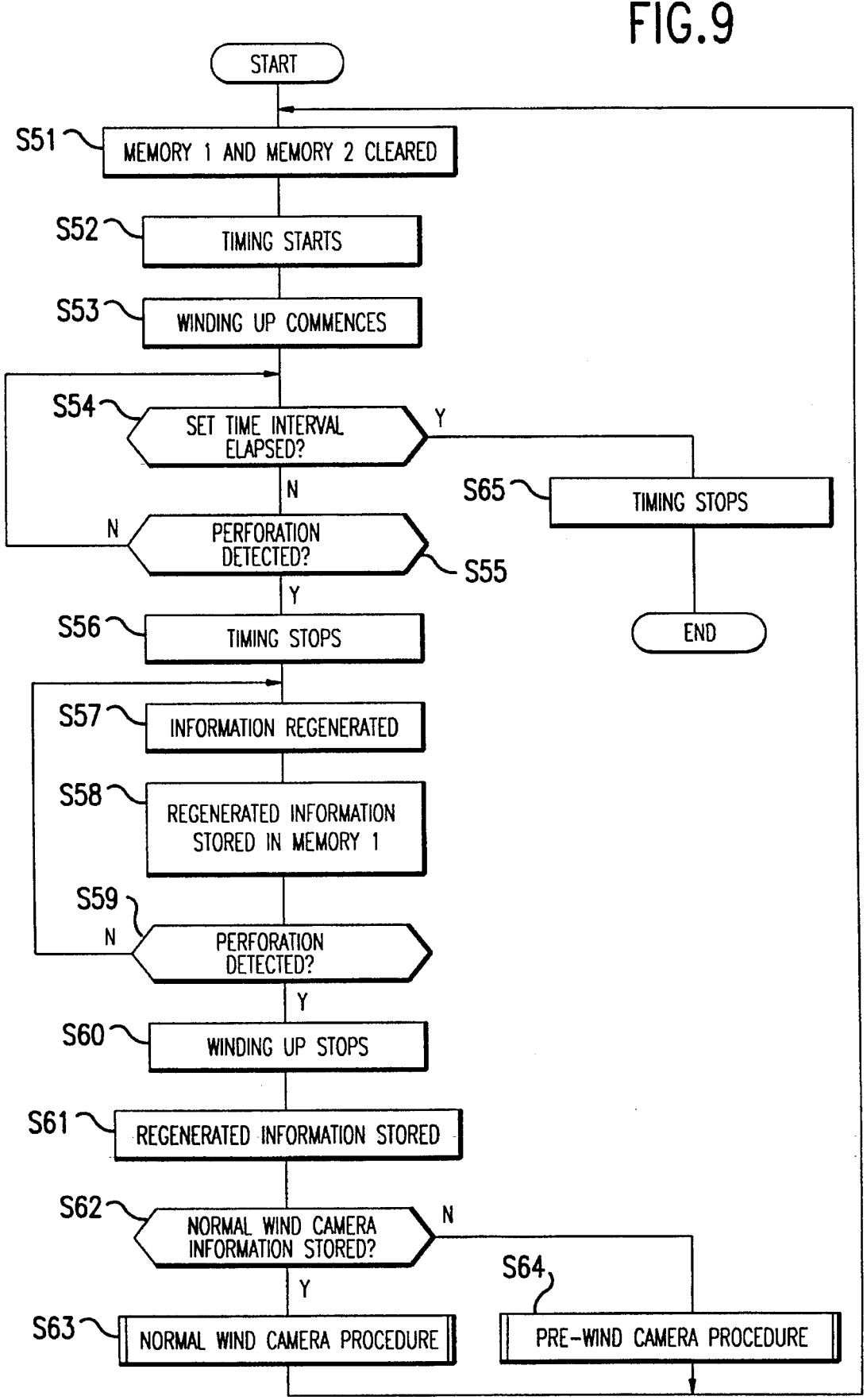
FIG. 9 is a flow chart describing the operation of a printing device.

A photographic regulation procedure according to another embodiment of the invention followed by the regulating circuit 51 of the pre-wind camera 10' is described hereafter, with reference to the flow chart of FIG. 8.

The cartridge 5 is loaded into the camera 10', and when the cartridge cover (not shown) is shut the program in FIG. 8 is activated. First, in step S21, the parameter "n" used to count the number of perforations is set at 0, and in step S22 the winding of the film by the winding device 53 commences.

In step S23, the program waits until the perforation 3a is detected by the perforation detection device 54. When the perforation is detected, the program proceeds to step S24 and increases the parameter "n" by 1. In step S25, it is determined whether or not the perforation 3c has been detected by the trailing end detection device 55, or in other words, whether or not the film has reached the end.

If the film has not yet reached the end, the program returns to step S23; if the film has reached the end, the winding up of the film 1 by the winding device 53 is stopped in step S26.

Next, in step S27, the value of n−1 is exchanged for the variable N which indicates the total number of photographs, and "n" is reset to 1. Hereafter, "n" becomes the value indicating the photographic order of the pre-wind camera 10', or in other words, the parameter that shows the frame number, as counted from the end frame.

In step S28, the program waits until the release switch SW1 is on. When the switch SW1 is on, photography is performed via the exposure regulating device 56 in step S29. In step S30, the information that is to be recorded onto the magnetic recording area 4 of the film 1 relating to this photographic frame is set.

In step S31, rewinding of the film 1 by the rewinding device 58 commences, and in step S32 a determination is made as to whether or not parameter "n" is 1. If n=1 the program proceeds to step S35, sets flag "s" to 0, and proceeds to step S36. Here, the flag "s" is a flag that becomes "1" if the information set in the above-mentioned step S30 (set information) is the same as the information stored in the memory 57 (stored information), and which becomes "0" if the information is different.

Next, in step S36, a determination is made as to whether or not n=1. If n=1, the program proceeds to step S37; if n≠1, the program proceeds to step S38.

In step S37, pre-wind camera information is recorded onto the magnetic recording area 4 of the film 1 by the recording circuit 52 via the magnetic head 17.

Next, in step S38, the set information is recorded onto the magnetic recording region 4 of the film 1 by the recording circuit 52 via the magnetic head 17, and the program proceeds to step S39. In this instance, since the film feed direction when the information is recorded on the pre-wind camera 10' is opposite that of the normal wind camera 10, the information recording order in steps S37 and S38 is in the opposite direction. The time to record the pre-wind camera information and the set information are somewhat less than the time required to wind the film the length of one frame (the time until the next perforation 3a is detected).

If it is determined in step S32 that n≠1, the program proceeds to step S33, and it is determined whether or not the above-mentioned set information is the same as the information stored in the memory 57 in step S44, which is described hereafter. If the information is not the same, the program proceeds to the above-mentioned step S35; if the information is the same, the program sets the flag "s" to 1 in step S34 and then proceeds to step S39.

In step S39, the program waits until a perforation 3a is detected by the perforation detection device 54, or in other words, until the film 1 has been rewound the length of one frame. When rewinding is complete, the parameter "n" is increased by 1 in step S40, after which the program proceeds to step S41. In step S41, the total number of frames N is compared with parameter "n," and if n≦N it is determined that unexposed frames still remain. The program then proceeds to step S42, rewinding of the film 1 is stopped, and the program proceeds to step S43. In step S43, the flag "s" is evaluated. If s≠0 the program returns directly to step S28; if s=0, the program returns to step S28 after storing the information set during the above-mentioned step S30 in the memory 57 in step S44. If n>N it is determined that all frames have been photographed. The program then proceeds to step S45, stands by during the time required for the film 1 to be completely rewound into the cartridge 5 (this time is set in advance), and then proceeds to step S46. In step S46, the rewinding device 58 is stopped, after which the procedure is completed.

According to the procedure of FIG. 8 described above, photography begins from the last frame (the Lth frame) of the film 1, and when photography of the last frame is completed, the set information and pre-wind camera information for the frame is recorded during rewinding. When other frames are photographed, a determination is made as to whether or not the information set in relation to those frames is the same as the information stored in the memory 57 (this information corresponds to the information relating to the previous frame). If the information is not the same, the set information is recorded; if the information is the same, no information is recorded for the current photographic frame under consideration.

In the case of the pre-wind camera 10', the above-mentioned previous frame is comprised of the frame on the trailing end side of the current photographic frame.

According to the above, when the same information continues for multiple frames, the information is only recorded for the first of the frames to be photographed and no information is recorded for the other frames. Therefore, according to the present embodiment, the amount of information to be recorded is greatly reduced when compared to recording the same information for each of several consecutive frames.

The print regulation procedure accomplished by the regulating circuit 81 (FIG. 6) of a printing device is described hereafter with reference to the flow charts of FIGS. 9 to 14.

A program is activated when a roll of several connected strips of developed film 70 is set in the printing device and the start switch is turned on. In this instance the above-mentioned developed film 70 includes film photographed by cameras without any information recording means, in addition to film photographed by the normal wind camera 10 and the pre-wind camera 10' described above.

First, in step S51, the contents of first memory 87 and second memory 88 are cleared. In step S52, timing commences, and in step S53 the winding of the developed film 70 by the developed film feeding device 82 commences. In step S54, a determination is made as to whether or not a set time interval has elapsed from the start of the timer. If the set time interval has not elapsed, a determination is made in step S55 as to whether or not a perforation has been detected by the perforation detection device 83, absent which the program returns to step S54.

If it is determined in step S54 that the set time interval has elapsed, or in other words, if a perforation is not detected within the set time interval, it is determined that the roll of developed film 70 has reached the trailing end, and the timing is stopped in step S65, ending the procedure. Conversely, if a perforation is detected in step S55, or specifically, if a perforation is detected within the set time interval, it is determined that the perforation at the leading end of one roll of developed film 70 has been detected, and the program stops the timing in step S56 and proceeds to step S57.

In step S57, the information recorded onto the magnetic recording area of the developed film 70 is regenerated by the regenerating circuit 85 via the magnetic head 74. In step S58, the regenerated information is stored in the first memory 87. Next, in step S59, a determination is made as to whether or not a perforation has been detected by the perforation detection device 83, or in other words, whether or not the film has been fed the length of one frame. Steps S57 and S58 are repeatedly executed until it is determined in step S59 that a perforation has been detected. Thus, all of the information for one frame becomes stored in the first memory 87.

When it is determined in step S59 that a perforation has been detected, the program proceeds to step S60 and the feeding of the developed film 70 by the developed film feeding device 82 stops, after which the regenerated information stored in the first memory 87 is decoded in step S61. In step S62, a determination is made as to whether or not the normal wind camera information is included in the decoded information. If the normal wind camera information is included, it is determined that the film has been photographed by a normal wind camera 10 and the normal wind camera procedure is carried out in step S63. If it is determined in step S62 that the normal wind camera information is not included, it is determined that the film has not been photographed by a normal wind camera 10, and the pre-wind camera procedure is carried out in step S64. When steps S63 and S64 are completed the program returns to step S51, and the procedure described above is repeated.

The details of the normal wind camera procedure mentioned above in step S63 are shown in FIG. 10 and FIG. 11.

Figure 10:
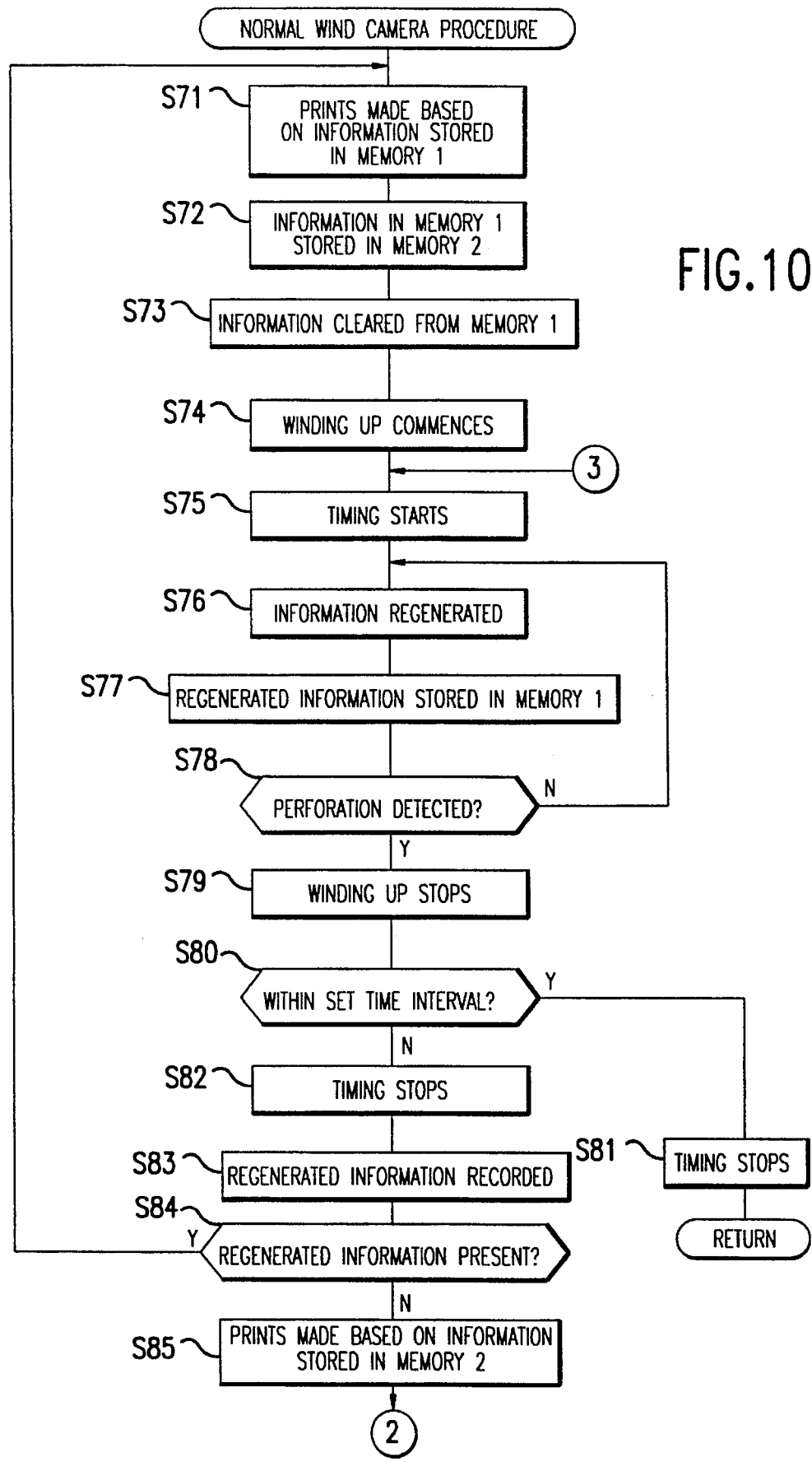
FIG. 10 is a flow chart showing the details of a normal wind camera procedure of FIG. 9.

First, in step S71 of FIG. 10, print conditions are set based on the information stored in the first memory 87 in the above-mentioned step S58, under which conditions prints are made by the print-making device 84. The print conditions are set based on the information regenerated from the magnetic recording region of the developed film 70, and may include, for example, in addition to exposure conditions, information as to whether or not there are printed characters on the print, trimming limits, print size, the number of prints, and the like.

Next, in step S72, the information stored in first memory 87 is stored in the second memory 88 and in step S73 the information in the first memory 87 is cleared. In step S74, the winding up of the developed film 70 by the developed film feeding device 82 commences, and in step S75, the timing commences and the program proceeds to step S76. This timing is meant to determine whether or not the referenced perforation is detected within a predetermined set time interval.

In step S76, the information from the magnetic recording area 4 of the developed film 70 is regenerated by the regenerating circuit 85 via the magnetic head 74, in step S77 the regenerated information being stored in the first memory 87. Steps S76 and S77 are repeatedly executed until the perforation is detected by the perforation detection device 83 in step S78. When it is determined in step S78 that the perforation has been detected, the program proceeds to step S79 and the winding up of the developed film 70 by the developed film feeding device 82 stops. All of the information for one frame is stored in the first memory 87 by repeating the above-mentioned steps S76 and S77.

In step S80, a determination is made as to whether or not the timing interval is within a predetermined set time interval. If the timing interval is within the predetermined interval in step S80, the perforation detected is perforation 3c and it is determined that the procedure has been completed for the length of one roll of film among the several rolls of developed film 70 that have been connected together. After the timing has stopped in step S81, the program returns to the procedure of FIG. 9. Conversely, if the timing interval is not within the predetermined interval in step S80, the perforation detected is perforation 3a and it is determined that the developed film 70 has finished moving the length of one frame. The program proceeds to step S82, stops the timing, and proceeds to step S83. In step S83, the regenerated information stored in the first memory 87 is decoded.

In step S84, a determination is made as to whether or not the information recorded on the magnetic recording area of the developed film 70 is among the information decoded in step S83. If information was recorded onto the magnetic recording area of the photographic frame during photography, it is determined in step S84 that the information is included in the information decoded in step S83, in which case the program returns to step S71. Conversely, if information was not recorded onto the magnetic recording area of the photographic frame during photography, the program proceeds to step S85, the print conditions being set based on the information stored in the second memory 88 in the above-mentioned step S72, and the prints being made by the print-making device 84 according to the print conditions.

Figure 11:
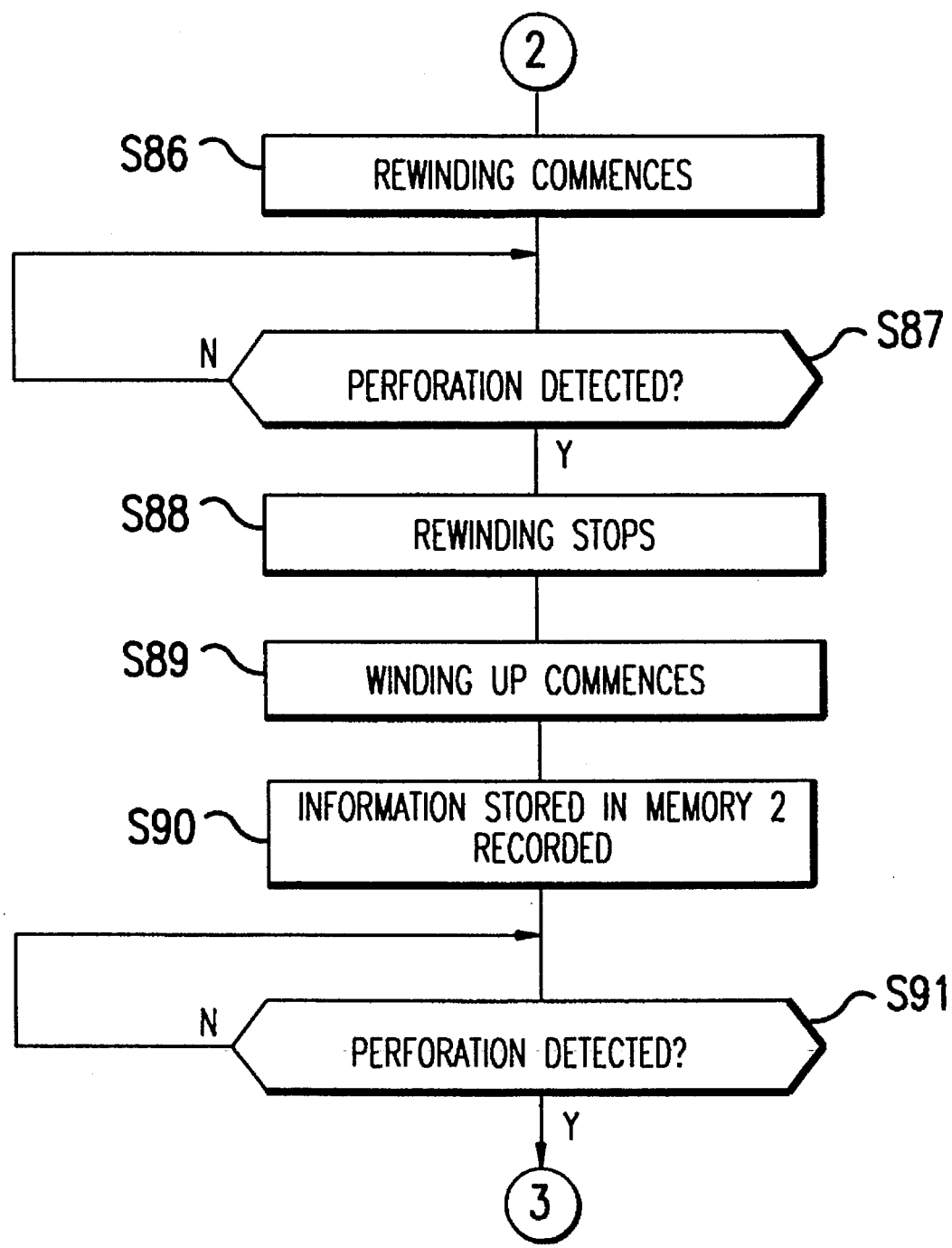
FIG. 11 is a flow chart that continues from FIG. 10.

From step S85, the program proceeds to step S86 in FIG. 11. Rewinding of the developed film 70 by the developed film feeding device 82 commences, and in step S87 the program waits until a perforation is detected by the perforation detection device 83. When a perforation is detected, it is determined that the film has been rewound the length of one frame and the program proceeds to step S88, where the rewinding of the developed film 70 by the developed film feeding device 82 stops. Next, in step S89, the winding up of the developed film 70 by the developed film feeding device 82 commences, and in step S90 the information stored in the second memory 88 is recorded onto the magnetic recording area of the developed film 70 by the recording circuit 86 via the magnetic head 74. This recording is completed in somewhat less time than is required to wind up the film the length of one frame. Next, in step S91, the program waits until a perforation is detected by the perforation detection device 83, in which case, the program returns to step S75 in FIG. 10.

Through the procedures of FIG. 10 and FIG. 11 described above, when information is recorded for the frame from which a print is to be made on a film which has been photographed by a normal wind camera 10, the print is made based on this information and the information is stored in the second memory 88. When information is not recorded for the frame from which a print is to be made, the print is made based on the information stored in the second memory 88. If information is not recorded, it is because there is no problem making the print using the same information as in the previous frame. Thus, by making the print with the information recorded in the above-mentioned second memory 88, a suitable print can be obtained.

The printing device of the present embodiment is constructed so as to record the same information as was on the previous frame for frames for which no information is recorded, as described in steps S86–S90. Therefore, even when the developed film 70 is divided into fixed numbers of frames (for example, 6 frames), no problem arises when the prints are made again.

Figure 12:
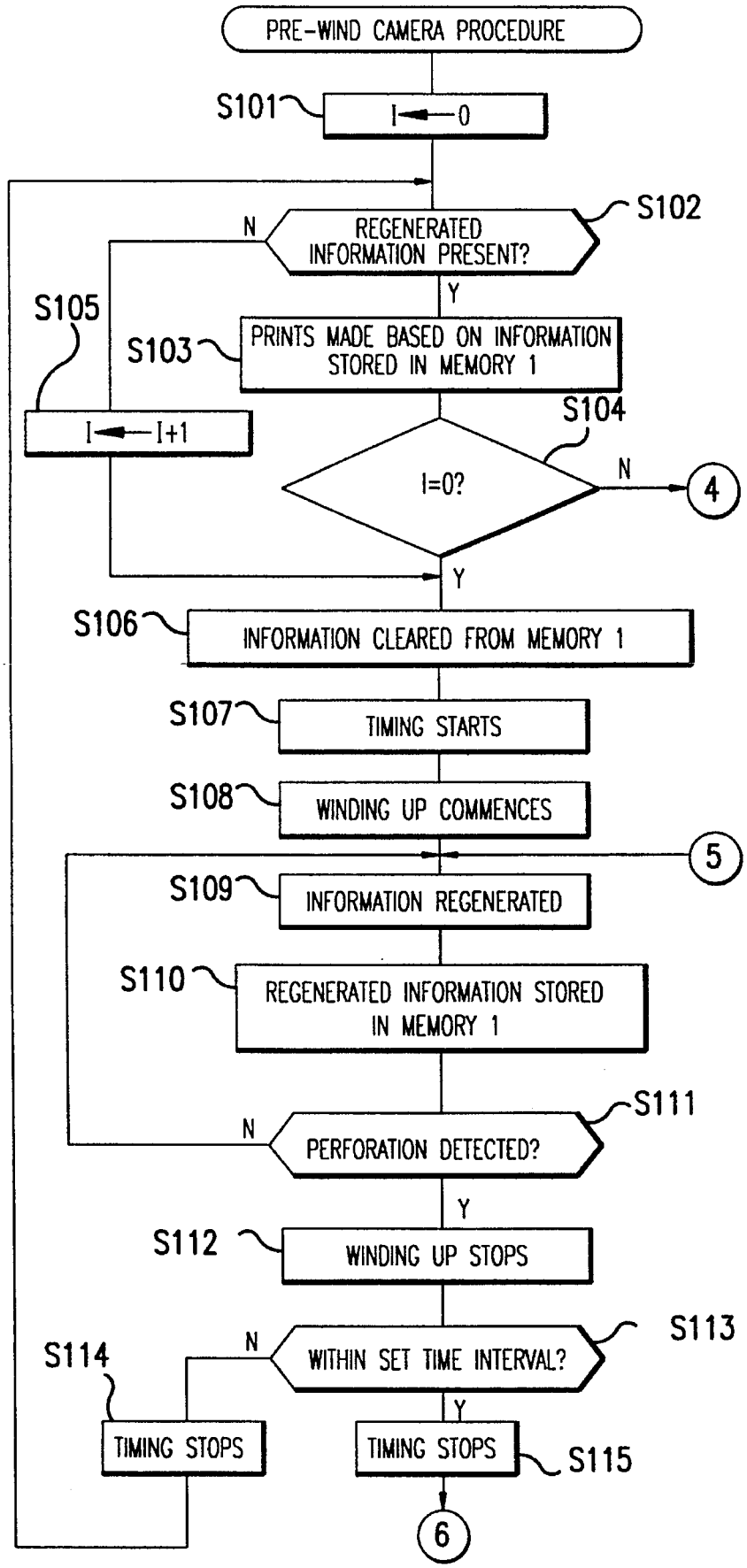
FIG. 12 is a flow chart showing the details of a pre-wind procedure of FIG. 9.
Figure 13:
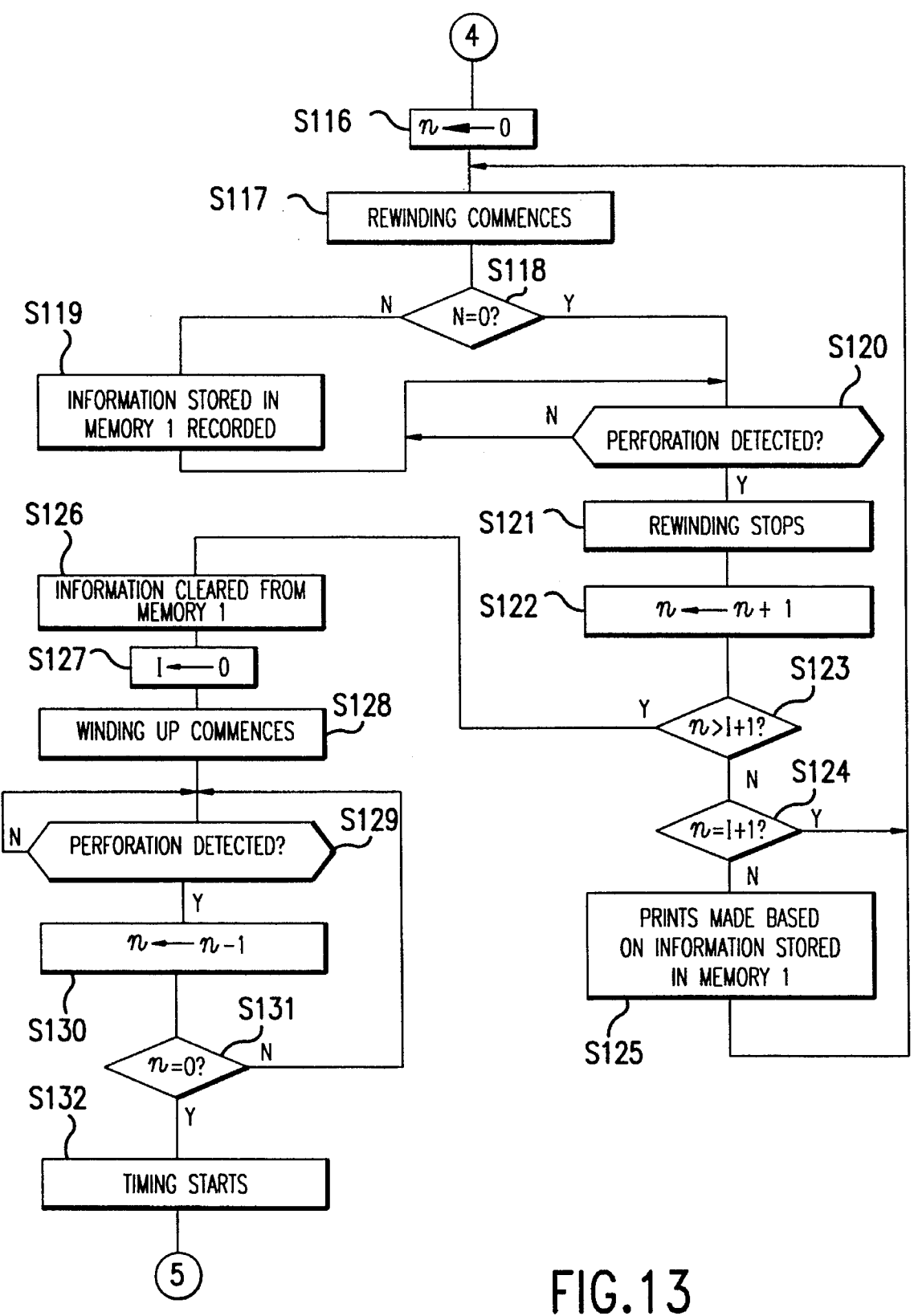
FIG. 13 is a flow chart that continues from FIG. 12.
Figure 14:
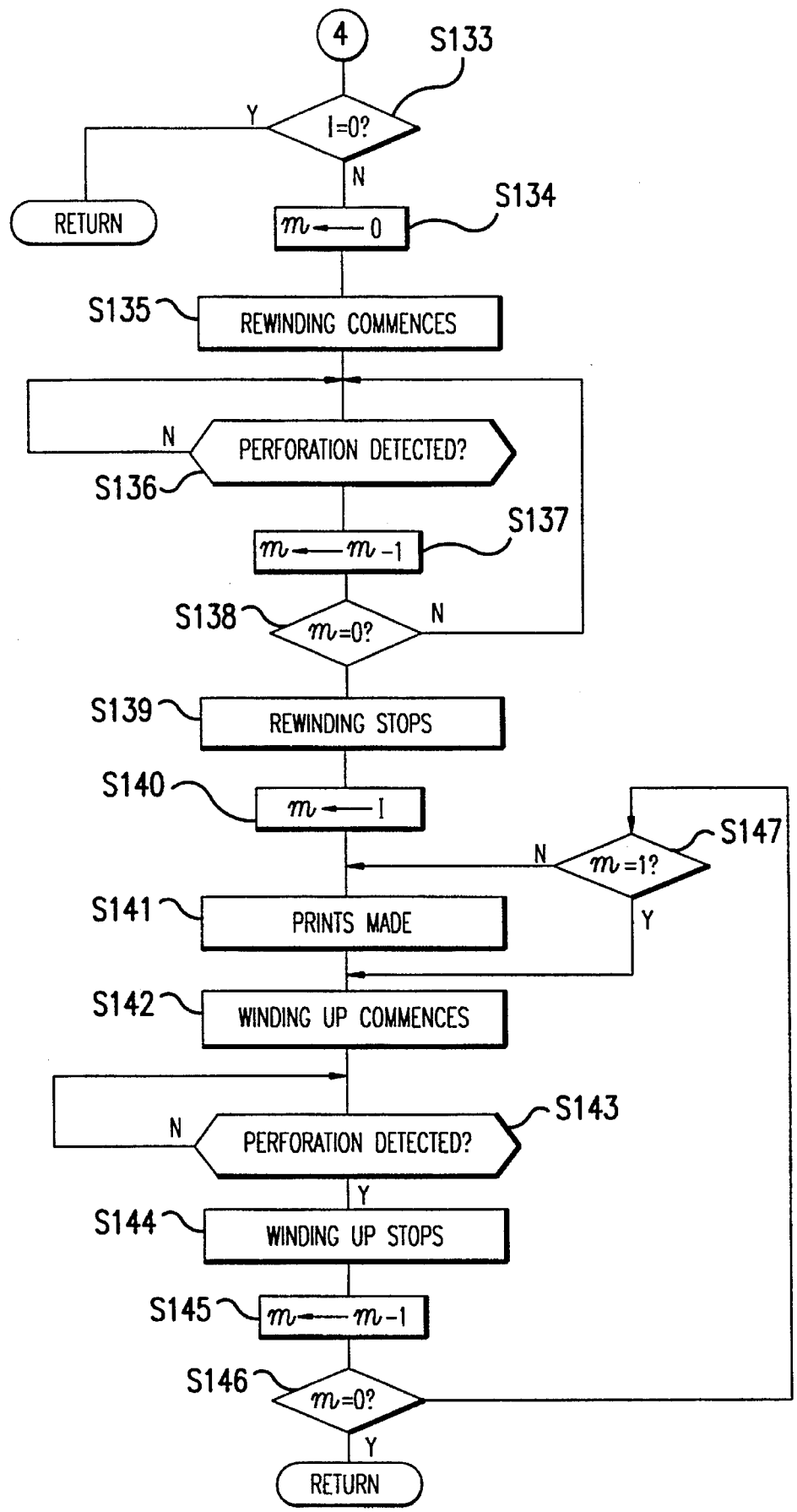
FIG. 14 is also a flow chart that continues from FIG. 12.

Details of the pre-wind camera procedure mentioned above in step S64 (FIG. 9) are shown in FIGS. 12 to 14.

First, in step S101 of FIG. 12 the count value I is reset to 0, the count value I showing the number of frames onto which information is not recorded. In step S102, a determination is made as to whether or not the information recorded onto the magnetic recording area of the developed film 70 is included in the information stored in the first memory 87. If the information is not found to be included in step S102, the program proceeds to step S105, the above-mentioned counter value I is increased by 1, and the program proceeds to step S106.

Conversely, if the information is found to be included in step S102, the program proceeds to step S103, the print conditions are set based on the information stored in the first memory 87, and prints are made by the print-making device 84 based on the print conditions. In step S104, a determination is made as to whether or not the count value I is 0, or in other words, whether or not there is not even a single frame left with no information. If there is no frame left with no information, the program proceeds to step S106; if there is a frame left with no information, the program proceeds to step S116 in FIG. 13.

In step S106, the information stored in the first memory 87 is cleared, and the timing commences in step S107. This timing determines whether or not perforation 3c is detected within a predetermined set time interval.

In step S108, the winding up of the developed film 70 by the developed film feeding device 82 commences. In step S109 the information stored on the magnetic recording area of the developed film 70 is regenerated by the regenerating circuit 85 via the magnetic head 74, and in step S110 the regenerated information is stored in the first memory 87.

In step S111 a determination is made as to whether or not a perforation has been detected by the perforation detection device 83, and steps S109 and S110 are repeated until a perforation is detected in this step S111. When a perforation is detected in step S111, the winding up of the developed film 70 by the developed film feeding device 82 stops in step S112. Through the repetition of steps S109 and S110, all of the information for one frame is stored in the first memory 87.

Next, in step S113, a determination is made as to whether or not the timed interval is within a predetermined set time interval. If the timed interval is not within the predetermined set time interval, it is determined that the developed film 70 has finished moving the length of one frame, and after the timing stops in step S114 the program returns to step S102. If it is determined in step S113 that the timed interval is within the predetermined set time interval, it is determined that the end of one of the developed rolls of film that have been connected together into the larger roll has been reached, the program proceeds to step S115, the timing stops, and the program proceeds to step S133 of FIG. 14. The procedure of FIG. 14 is described in detail hereafter.

Through the procedures listed up to this point, a determination is made during the winding up of the developed film 70 as to whether or not there is information recorded for each frame. Prints are made based on the information given for frames which contain information, while frames with no information are skipped; the number of the frames being merely counted, and no prints are made. When a frame with information is found after a frame with no information, the program proceeds from step S104 to step S116 of FIG. 13, where the count value "n" is reset to 0.

The count value "n" is used to count the number of perforations. In step S117, prints are made for the referenced skipped frames (frames without information), and rewinding by the developed film feeding device 82 of the developed film 70 for which information is to be recorded commences. In step S118 a determination is made as to whether or not the count value "n" is 0. If n≠0 the program proceeds to step S119, and the information stored in the first memory 87 is recorded by the recording circuit 86 via the magnetic head 74 to the magnetic recording area of the developed film 70. The program then proceeds to step S120.

Since the information recorded in step S119 is carried out during rewinding, it is necessary to reverse the order of information from when the information was recorded during winding up. Recording is completed somewhat more quickly than the time required to rewind the length of one frame.

If in Step S118 it is determined that n is 0, the program skips step S119 in order to avoid a second recording, since information is already recorded for that frame. The program then proceeds to step S120 and waits until a perforation is detected by the perforation detection device 83. When a perforation is detected, the rewinding of the developed film 70 by the developed film feeding device 82 stops in step S121, and in step S122 the count value "n" is increased by 1. In steps S123 and S124, the count value "n" and the count value of I+1 are compared.

If there is a frame among the skipped frames mentioned above for which a print has not yet been made or for which information has not yet been recorded, steps S123 and S124 are determined to be "NO" because n<I+1 and the program proceeds to step S125. In step S125, the print conditions are set based on the information recorded in the first memory 87, prints are made by the printmaking device 84 according to these print conditions, and the program returns to step S117. Prints are made for all of the frames that were skipped, but when there is no information recorded for the last frame, since n=I+1, step S123 is determined to be "NO," step S124 is determined to be "YES," and the procedure returns to step S117. Since n>I+1 when prints have been made and information recorded for every skipped frame, step S123 is determined to be "YES" and the program proceeds to step S126.

In step S126, the information stored in the first memory 87 is cleared, and in step S127 the count value I is reset to 0, since there are no longer any frames with no information, due to the procedure described above. In step S128, the winding up of the developed film 70 by the developed film feeding device 82 commences, and the program proceeds to step S129. When a perforation is detected by the perforation detection device 83 in step S129, the count value "n" is decreased by one. If it is determined in step S131 that n≠0, the program returns to step S129 and steps S129 and S130 are repeated. If it is determined in step S131 that n=0, the timing commences in step S132 and the program returns to step S109 of FIG. 12.

Through steps S128–S132 described above, the developed film 70 is again wound up the length that the developed film was rewound. After step S132, new frames that have not yet been wound up are wound up, and the same procedure is carried out as described above.

If step S113 in FIG. 12 is determined to be "YES," or in other words, when the developed film 70 has finished moving the length of one frame, timing is stopped in step S115 and the program proceeds to step S133 in FIG. 14. In step S133, a determination is made as to whether or not the count value I is 0. In this instance, I=0 means that information has been recorded onto the final frame, and indicates that the film has been photographed by a pre-wind camera 10'. In this case, since the prints have been made and information recorded for all of the frames of one roll, the program returns to the procedure in FIG. 9 and the procedure is again repeated from step S51.

If the count value I is not 0, it indicates that information is not recorded for the final frame. Since the pre-wind camera procedure is activated when information is not recorded in the first frame, as described above, a "NO" in step S133 means that information is not recorded on the first or last frames of the film, or in other words, it is assumed that the film has been photographed by a camera with no information recording means. In this case, the program proceeds to step S134, and the count value I is exchanged for the count value "m." Next, in step S135, rewinding of the developed film 70 by the developed film feeding device 82 commences, and when a perforation is detected by the perforation detection device 83 in step S136, the count value "m" is decreased by 1 in step S137. The program returns to step S136 and repeats steps S136 and S137 until it is determined in step S138 that m=0. When it is determined that m=0 in step S138, rewinding of the developed film by the developed film feeding device 82 is stopped in step S139, thus aligning the first frame with the aperture.

In step S140, the count value I is again exchanged for the count value "m." In step S141, the print conditions are set by commonly used methods that do not use information from the film and the prints are made by the print-making device 84. In step S142 the winding up of the developed film 70 by the developed film feeding device 82 commences, and when a perforation is detected by the perforation detection device 83 in step S143 the winding up of the developed film 70 by the developed film feeding device 82 is stopped in step S144, the count value "m" being decreased by 1 in step S145. When it determined in step S146 that the count value "m" is 0, it is determined that the procedure is completed for one roll of the developed film 70 and the program returns to the procedure of FIG. 9. The procedure is again repeated from step S51, and when it is determined that the count value "m" is not 0 the program proceeds to step S147.

In step S147, a determination is made as to whether or not the count value "m" is 1, and if the count value "m" is not 1 it is determined that the print of the final frame is not yet completed and the program returns to step S141. If the count value "m" is 1, printing of the final frame is completed, and the program returns to step S142 in which the final perforation is to be detected.

Through the procedures of FIGS. 12 to 14 described above, when information is recorded for a frame which is to be printed from a film that has been photographed by a pre-wind camera 10', the print is made based on this information and the information is stored in the first memory 87. When information is not recorded for the frame from which the print is to be made, the print is made based on the information stored in the first memory 87. If information is not recorded it means that the print may be made with the same information used for the previous frame without any problem, and therefore a suitable print may be obtained by making the print from the information stored in the above-mentioned memory 87.

For film that has been photographed using a camera with no recording means, prints are made using a method that is the same as a commonly known method.

Since the same information as on the previous frame is recorded for frames in which no information is initially recorded, no problem arises when prints are made again, even when the developed film 70 is divided into fixed numbers of frames (for example, 6 frames).

In the construction of the embodiment described above, the magnetic head 17 and recording circuit 52 comprise the recording means, and the regulating circuit 51 comprises the regulating means.

Information recording is not limited to magnetic recording; for example, an optical copying device may also be used. Also, although a normal wind camera 10 and a pre-wind camera 10' were described, the present invention may also be applied to a camera on which the normal wind method and the pre-wind method are interchangeable.

According to the present invention, since information is not recorded for the frame under consideration when it is confirmed that the information relating to the photographic frame under consideration is the same as the information relating to the previous photographic frame, when the same information continues for multiple frames the information is only recorded for the first of the frames photographed. Thus, the amount of information to be recorded to the information recording area of the film can be reduced when compared with recording the same information to each frame, and wasteful consumption of the battery power source can be prevented.

In addition, if the information indicating whether the film has been photographed by the normal wind method or by the pre-wind method is recorded independent of the information relating to the photographic frame, the prints can be made with no problem by reading in the information to the printing device, regardless of the method by which the film was photographed.

What is claimed is:

1. A camera capable of recording information, comprising:

recording means for recording information onto an information recording area on a film, as the film is being fed, wherein the information relates to each frame of a film;

determining means for determining whether information recorded on one photographic frame is the same as information recorded on a photographic frame previous to said one photographic frame; and regulating means for regulating the recording means, wherein when the determining means determines that information relating to said one photographic frame is the same as information relating to the previous photographic frame, the information relating to said photographic frame is not recorded, and when the determining means determines that information relating to said one photographic frame is not the same as the previous photographic frame, the information is recorded.

2. The camera according to claim 1, wherein the recording means records information indicating whether the film has been photographed by a method selected from one of a normal wind method and a pre-wind method, the recording means recording the information onto the information recording area independent of information relating to a photographic frame.

3. The camera according to claim 1, wherein the information relating to the one photographic frame includes information for use in a photographic laboratory.

4. A camera according to claim 3, wherein the information for use in the laboratory includes information that suppresses an exposure correction action performed in the laboratory.

5. The camera according to claim 1, wherein the camera is a normal winding type camera.

6. The camera according to claim 1, wherein the camera is a pre-winding type camera.

7. The camera according to claim 1, wherein the camera operates interchangeably as a normal and pre-winding type camera.

8. The camera according to claim 1, wherein the recording means comprises a magnetic head and a recording circuit.

9. The camera according to claim 1, wherein the recording means comprises an optical recording device.

10. The camera according to claim 1, further comprising:
a first perforation detection element that detects when the one photographic frame is aligned with an aperture of said camera; and
a second perforation detection element for detecting an end frame of said film.

11. The camera according to claim 10, wherein said first and second perforation detection elements comprise photo-reflectors.

12. The camera according to claim 10, wherein said first and second perforation elements comprise photointerrupters.

13. A method of recording information relating to each frame of a film, the method comprising:
feeding the film within a camera;
recording information relating to each frame of the film on an information recording area of the film;
determining whether information on one frame of film is the same as information on a previous photographic frame;
preventing the recordation of information of the one frame of film when the information is the same as the previous photographic frame; and
allowing the recordation of information of the one frame of film when the information is not the same as the previous photographic frame.

14. The method according to claim 13, wherein the recording step comprises recording information onto the information recording area to indicate whether the film has been photographed by a method selected from one of normal wind method and a pre-wind method, the recording being independent of information relating to a photographic frame.

15. The method according to claim 13, wherein the recording step comprises recording information used in a photographic laboratory.

16. The method according to claim 15, wherein the recording step comprises recording information that suppresses an exposure correction action performed in the laboratory.

17. The method according to claim 13, further comprising:
detecting perforations on said film to align each of said frames with an aperture of said camera; and
detecting perforations on said film indicating an end frame of said film.

18. The method according to claim 13, wherein the feeding step comprises feeding the film within a camera, wherein the camera is selected from the group consisting of a normal winding type camera, a pre-winding type camera and a camera used interchangeably as a normal winding camera or a pre-winding camera.

19. A device for processing developed film comprising:
a film feeding mechanism that feeds developed film, the developed film having photographic frames;
a perforation detector that detects film perforations;
an information regenerator that regenerates information from a recording area of one photographic frame of the developed film;
a printer that prints the regenerated information onto a recording area of another photographic frame of the developed film; and
a regulator that regulates the printing of the regenerated information relating to the one photographic frame of the developed film wherein the regenerated information corresponds to previous photographic frames of the film.

20. The device according to claim 19, wherein said printer prints information according to predetermined exposure correcting values.

21. A camera capable of recording information, comprising:
a recorder which records information onto an information recording area on a film, as the film is being fed, wherein the information relates to each frame of a film;
a determining unit which determines whether information recorded on one photographic frame is the same as information recorded on a photographic frame previous to said one photographic frame; and
a regulator electrically combined with the recorder and the determining unit for regulating the recorder, wherein when the determining unit determines that information relating to said one photographic frame is the same as information relating to the previous photographic frame, the information relating to said photographic frame is not recorded, and when the determining unit determines that information relating to said one photographic frame is not the same as the previous photographic frame, the information is recorded.

* * * * *